United States Patent [19]

Verdone

[11] 4,311,560
[45] Jan. 19, 1982

[54] STABILIZING DEVICE FOR CONTROL ROD TIP

[75] Inventor: Gary F. Verdone, Granby, Conn.

[73] Assignee: Combustion Engineering, Inc., Windsor, Conn.

[21] Appl. No.: 36,203

[22] Filed: May 4, 1979

[51] Int. Cl.³ ............................................. G21C 7/10
[52] U.S. Cl. .................................. 376/225; 376/327; 376/285
[58] Field of Search .............. 176/36 R, 36 C, 36 SA, 176/86 R, 19 R, 81

[56] References Cited

U.S. PATENT DOCUMENTS

| | | | |
|---|---|---|---|
| 3,309,283 | 3/1967 | Alfille et al. | 176/81 |
| 3,479,250 | 11/1969 | Ripley | 176/36 R |
| 3,486,975 | 12/1969 | Ripley | 176/36 R |
| 3,562,109 | 2/1971 | Bezold et al. | 176/36 SA |
| 3,640,845 | 2/1972 | Ripley | 176/36 R |
| 3,855,060 | 12/1974 | Dietrich et al. | 176/36 SA |
| 4,053,355 | 10/1977 | Vukovich | 176/36 C |

FOREIGN PATENT DOCUMENTS

| | | | |
|---|---|---|---|
| 52-1295 | 1/1977 | Japan | 176/36 R |
| 52-9795 | 1/1977 | Japan | 176/19 R |
| 52-9796 | 1/1977 | Japan | 176/19 R |
| 52-14195 | 2/1977 | Japan | 176/19 R |
| 52-18593 | 2/1977 | Japan | 176/19 R |

*Primary Examiner*—S. A. Cangialosi
*Attorney, Agent, or Firm*—L. James Ristas

[57] ABSTRACT

A control rod having a spring device on its lower end for eliminating oscillatory contact of the rod against its adjacent guide tube wall. The base of the device is connected to the lower tip of the rod. A plurality of elongated extensions are cantilevered downward from the base. Each extension has a shoulder for contacting the guide tube, and the plurality of shoulders as a group has a transverse dimension that is preset to be larger than the inner diameter of the guide tube such that an interference fit is obtained when the control rod is inserted in the tube. The elongated extensions form an open-ended, substantially hollow member through which most of the liquid coolant flows, and the spaces between adjacent extensions allow the flow to bypass the shoulders without experiencing a significant pressure drop.

8 Claims, 8 Drawing Figures

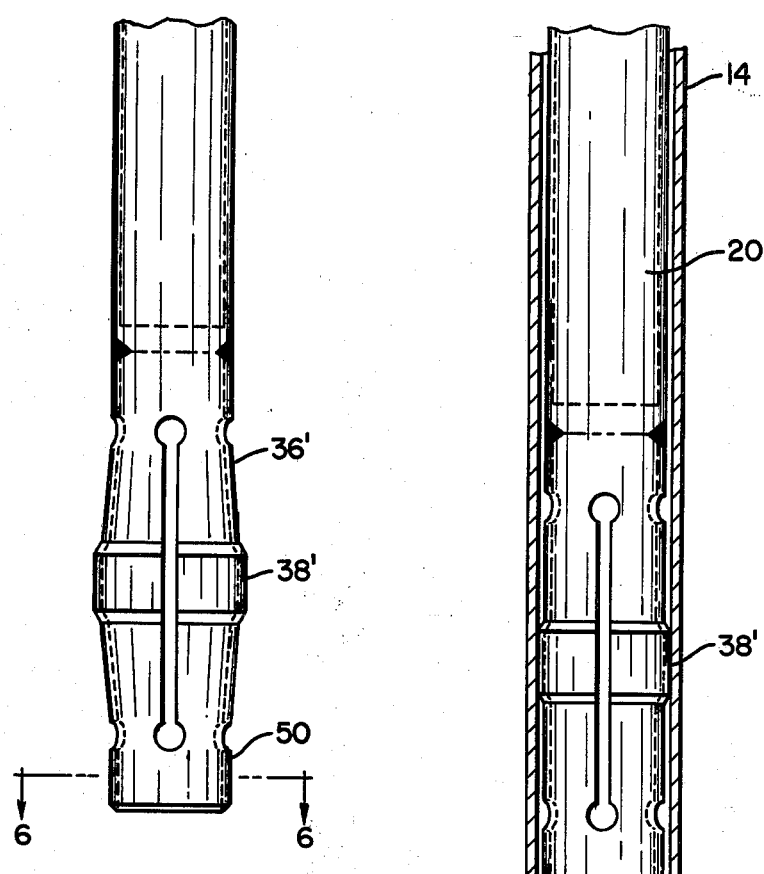
FIG. 5
FIG. 7
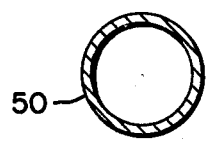
FIG. 6

STABILIZING DEVICE FOR CONTROL ROD TIP

BACKGROUND OF THE INVENTION

This invention relates to nuclear reactors having control rods reciprocable from above into a reactor core, and in particular to control rods reciprocable in guide tubes having a liquid flowing upward within the tube.

In a typical nuclear reactor the core is composed of a plurality of elongated fuel assemblies each containing a plurality of elongated fuel elements. A liquid coolant is pumped upward through the core in order to extract the generated heat for the production of useful work. The heat output of the core is usually regulated by the movement of control rods containing neutron absorbing material such as $B_4C$. In reactors of the pressurized-water type, each fuel assembly typically includes a plurality of cylindrical guide tubes through which cylindrical control rods are reciprocated. Some of the coolant flow is usually diverted into the lower end of the guide tube in order to cool the control rod, which generates heat in the nuclear transformation associated with its neutron absorbing function.

During typical power operation, most of the regulating control rods are maintained in a unique withdrawn position in which the lower tip of the control rod is within the guide tube at the upper end of the assembly. For reasons that are not fully understood, significant wear has been found on the inner walls of the guide tubes at precisely the elevation corresponding to the tip of the control rod in the withdrawn position. Flow tests on a laboratory model of the guide tube and control rod indicate that flow-induced vibration of the rod results in an oscillatory contact of the rod tip against the guide tube wall. It is believed that the source of the driving force is located well above the control rod tip, in the vicinity of the guide tube exit.

Continuous wear of the guide tube wall may lead to perforation of the tube and significant weakening of the fuel assembly frame. Thus, there has arisen the need to either eliminate the source of the flow induced driving force, or significantly mitigate its affect. Guide tube wear must be greatly reduced not only in nuclear reactors to be built in the future, but also in existing reactors.

SUMMARY OF THE INVENTION

The present invention provides a spring device on the lower end of the control rod which not only prevents the rod tip from impacting the guide tube wall, but also reduces the oscillatory behavior of the rod over its entire length. The base of the device is connected to or integral with the lower end seal of the control rod. A plurality of springs project from the base and are sized to provide a uniform, resilient interference fit against the guide tube wall. This maintains the rod tip substantially centered in the guide tube and also absorbs energy without impacting the guide tube walls. The portion of the springs that contact the tube walls have a large surface to distribute the biasing force over a large area on the guide tube, which helps prevent localized wear even with a substantial radial biasing force. The invention provides enough interference to avoid significant guide tube oscillation, without decreasing the scram time of the control rod.

In the preferred embodiment, a plurality of laterally spaced, elongated extensions are cantilevered downward from the base of the device. Each extension has a shoulder for contacting the guide tube, and the plurality of shoulders as a group has a transverse dimension that is preset to be larger than the inner diameter of the guide tube such that an interference fit is obtained when the control rod is inserted in the tube. The elongated extensions form an open-ended, substantially hollow member through which most of the liquid coolant flows, and the spaces between adjacent extensions allow the flow to bypass the shoulders without experiencing a significant pressure drop. Furthermore, the natural frequency of such a device a higher than that of the forcing functions and the control rod itself, so that the spring device will act as a damper rather than a contributor to the control rod oscillations.

The present invention has many desirable features in addition to its effectiveness in preventing guide tube wear. It is inexpensive to manufacture, compact, and easily installed on existing control rods. In the preferred embodiment, it can be built from a single piece of material, and has no moving parts.

BRIEF DESCRIPTION OF THE DRAWING

These and other objects and advantages of the invention will be evident from the following detailed description in which:

FIG. 5 is an elevation view of an alternate embodiment of the invention, showing the spring and shoulders in their neutral positions;

FIG. 6 is a cross section view along the line 6—6 of FIG. 5; and

FIG. 7 is a partially-sectioned elevation view of the alternate embodiment of the invention in interference fit with the guide tube.

DESCRIPTION OF THE PREFERRED EMBODIMENTS

Figure 1:
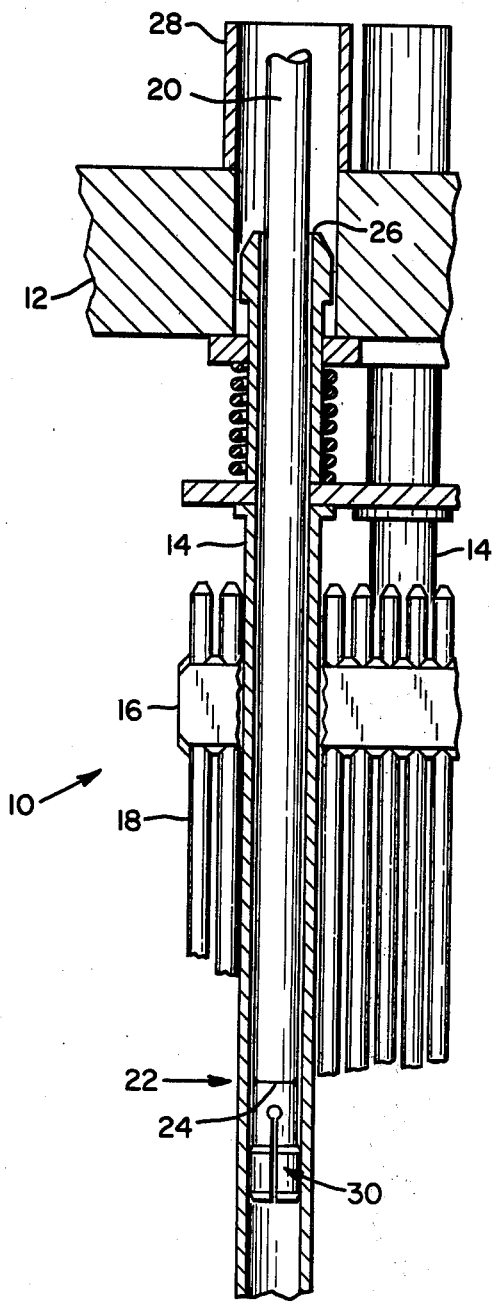
FIG. 1 is partially-sectioned elevation view of the upper end of a nuclear fuel assembly having the inventive control rod therein.

FIG. 1 shows the upper portion of a fuel assembly 10 held in place at the top by a fuel assembly alignment plate 12 and at the bottom by a lower fuel support plate (not shown). The assembly 10 includes a plurality of guide tubes 14 extending from the alignment plate 12 to the lower support plate, and a plurality of axially spaced grids 16 connected to the guide tubes 14. The grids 16 define a matrix of support springs (not shown) for spacing and supporting a plurality of fuel elements 18 associated with the assembly 10.

The power level of the reactor is usually regulated by the insertion and withdrawal of control rods 20. In modern pressurized water reactors, each fuel assembly 10 has guide tubes 14 adapted to receive control rods 20 over the entire length of the assembly. The control rod 20 is rigidly connected at its upper end to a drive mechanism (not shown) and, because it is quite elongated (15 to 20 feet long and less than 1 inch in diameter), the rod 20 is often not precisely centered within the guide tube 14. When the rod 20 is in the fully withdrawn position 22, the rod tip 24 is still within the guide tube 14.

When the control rod 20 is more fully inserted into the reactor core for absorbing neutrons, it will generate heat. The rod 20 is cooled by the upward flow of liquid coolant which enters the bottom of the guide tube 14, flows upward therein over the control rod 20, through the guide tube exit 26 and upward through shroud tubes 28 to be deposited in the upper portion of the reactor vessel (not shown).

Inspection of fuel assemblies 10 removed from operating nuclear reactors has shown patterns of wear on the inner surface of the guide tubes 14 containing control rods 20 at precisely the position 22 corresponding to the elevation of the control rod tip 24 when the rod 20 is in the unique withdrawn position. The present invention provides a spring device 30 extending from the tip 24 of the poison-bearing portion of the control rod, for essentially eliminating guide tube wear.

Figure 2:
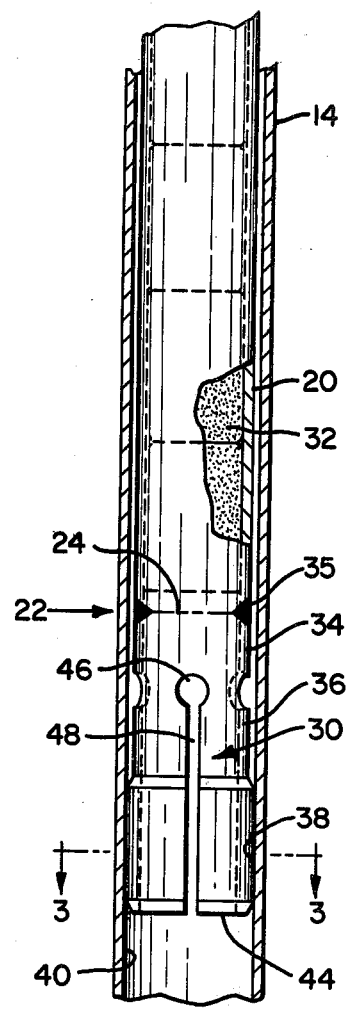
FIG. 2 is a partially-sectioned elevation view of the inventive control rod in interference fit with its guide tube.

FIG. 2 shows the lower portion of the control rod 20 within the guide tube 14 such that the control rod tip 24 is in the unique withdrawn position 22. The control rod tip 24 provides a seal on the lower end of the metal cladding of control rod 20 to isolate the poison-bearing pellets 32 from the liquid flowing within the guide tube. In one embodiment of the invention, the spring device 30 has a base portion 34 which is welded at 35 to the control rod tip 24 so that the device is rigidly connected thereto. In control rods to be built in the future, the base portion 34 may be integral with the material that seals the poison pellets 32 within the rod. A plurality of longitudinally extending projections 36 depend from the base 34, forming cantilever springs. The lower ends of the projection 36 have shoulders 38 formed thereon for contacting the guide tube wall 40 to provide an interference fit between the device 30 and the wall.

Figure 3:
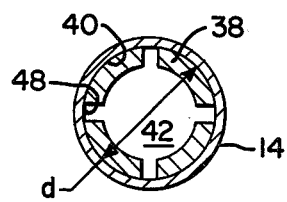
FIG. 3 is a cross section view along the line 3—3 of FIG. 2.

As can be seen in FIG. 3, the shoulders 38 on the cantilevered extensions 36 are urged against the wall 40 of the guide tube 14 because of the inherent stiffness of the extensions 36. The device 30 is manufactured to have a nominal diameter across shoulders 38 in the relaxed state which is larger than the inner diameter of the guide tube 14. Thus, when the device is inserted into the guide tube 14, a uniform radial biasing force will tend to center the control rod 20 and control rod tip 24 within the guide tube. In a typical embodiment where the guide tube inner diameter is less than one inch, the diametral interference fit is about 0.010 inches with a device made from Inconel X 750. In the configuration shown in FIGS. 2 and 3, each shoulder 38 provides about 2 pounds of radial biasing force.

This force is distributed over a relatively large surface area of the guide tube wall 40, and thereby prevents any localized wearing of the tube in the event the device experiences unexpected oscillation. For a tube 14 having an inner diameter d, a satisfactory device 30 of the type described above has four shoulders spanning about 270° of the circumference of the wall 40. The axial extent of the portion of the shoulder 38 that contacts the wall 40 is approximately d/2. It is believed that the device 30 can be made to perform most satisfactorily when the ratio of the total contact area of the shoulders 38 to the cross-sectional area of the guide tube 14 is at least ⅛. Depending on the magnitude of the coolant flow, the weight of the control rod 20, and the surface area of the shoulders 38, the spring constant at each shoulder 38 is believed most effective if in the range of 0.01 to 0.05 inches per pound.

It should be understood that the device 30 must be very short in relation to the length of the control rod in order to assure that the poison pellets 32 can be inserted completely within the fuel assembly. If the device 30 is more than a few inches long, the reactivity worth, or neutron absorption power, of the control rod could be significantly reduced. Inconel X750 has been found to provide the desired spring rates in a device about two inches long, and this material does not relax after being irradiated as do other materials such as Zircaloy.

Another consideration in the satisfactory performance of the device 30 is a provision for allowing the upward flowing coolant to pass over the device without experiencing a significant pressure drop. As shown in FIGS. 2 and 3, the extensions 36 extend longitudinally from the outer circumference of the base 34, and as a group form an elongated member having an open-ended bottom and a hollow inner region 42. Coolant flowing upward through the guide tube 14 enters the open end 44, enters the hollow region 42 and exits the device through holes 46 formed between the individual extensions 36. In addition, the lateral spacing of the extensions 36 forms passages 48 which also permit the liquid coolant to bypass the shoulders 38.

One important feature of the illustrated embodiment having cantilever springs 36 is the ability of the device 30 to be severely displaced to one side of the guide tube without exceeding the elastic limit of the spring 36. Given the requirement that the device be only a few inches long, it is not a simple matter to provide springs that have the required force supplied over a distributed area, without the spring being subject to unwanted buckling or inelastic deformation which could effect the spring rate and destroy the uniformity of the interference fit. Each cantilevered spring 36 shown in FIG. 2 has an unrestrained end 44 which is free to move axially to accommodate a large radial distortion.

Another requirement on the device is that the interference fit not be so tight as to significantly retard the scram time of the control rod. The scram time could also be affected if the pressure drop across the device were too large. The present invention satisfies these requirements, and, in addition, is compatible with current fuel assembly designs wherein the control rod buffering associated with a scram occurs at the bottom of the guide tube. The flexible cantilevered shoulders 38 can slide into the dash pot (not shown) at the bottom of the guide tube 14 and thereby assure that the poison material 32 will not be stopped above the lower end of the fuel.

Figure 4A:
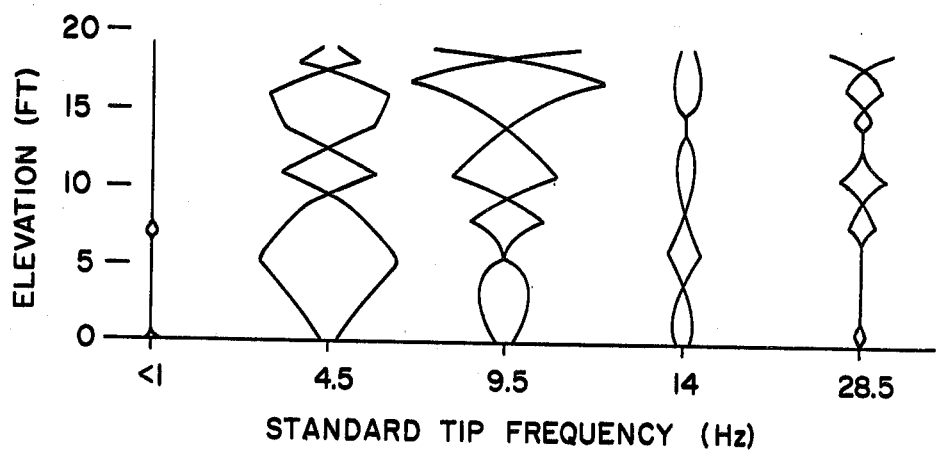
FIGS. 4a and 4b are graphic displays of the relative acceleration amplitudes of a typical control rod with and without the invention shown in FIG. 2.

Referring now to FIGS. 4a and b, there is shown in graphical form a summary of the mode shapes for the relative acceleration amplitudes of a standard control rod and a control rod having the invention described above. The data appearing on these graphs was generated in a laboratory mock-up of a guide tube having an inner diameter of 0.900 inches and a rod having an outer diameter of 0.816 inches containing a distributed mass equivalent to an actual control rod. The control rod was rigidly held at its upper end and the control rod tip was located 22 inches below the guide tube exit 26 (FIG. 1). Acceleration measurements were made at one foot intervals starting at the control rod tip (zero on the ordinate) over the entire length of the control rod (18 feet). The relative acceleration (g's) of the control rod at different elevations, as a function of the frequency of the vibrating tip (Hz) are plotted.

In FIG. 4a, it can be seen that at the control rod tip significant accelerations occur at less than 1 at 4.5, 9.5, 14, and 28.5 Hz. The severity of the rod oscillation at a given elevation on the control rod is related to the sum of the acceleration amplitudes at the various frequencies at that elevation. With the standard control rod, the total oscillation at the control rod tip has contributions from less than 1, 4.5, 9.5 and 14 Hz.

Figure 4B:
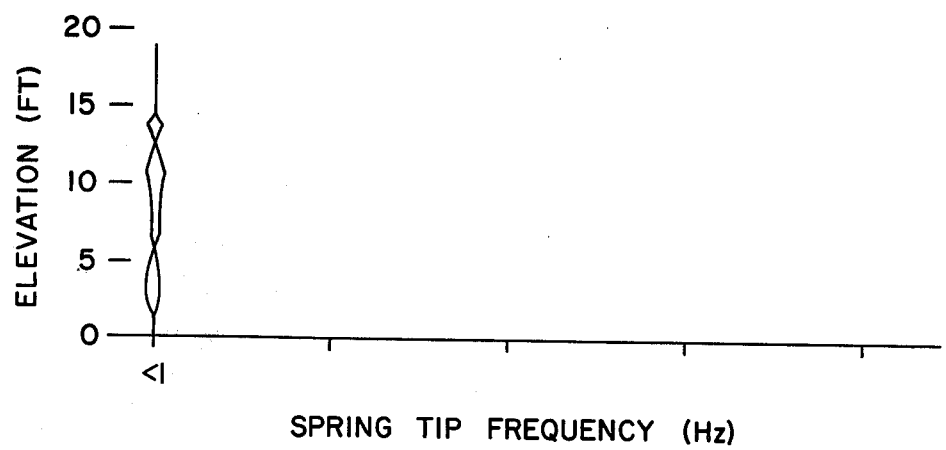

FIG. 4b shows the same test performed with a control rod having the inventive device 30. For the same liquid coolant flow rate (4500 pounds per hour), and, therefore, about the same driving force, the improved control rod displayed measurable accelerations only at 1 Hz or less, and at the control rod tip there was no measureable acceleration. Furthermore, the accelerations at higher elevations in the control rod were all small as compared with the total acceleration at a given elevation as shown in FIG. 4a. Thus, the invention not only eliminates vibrations at the control rod tip, but also reduces vibrations over the full length of the control rod.

Referring now to FIG. 5, an alternate embodiment of the invention is shown wherein the lower end of the extensions 36' are connected to a common ring 50 shown in section in FIG. 6. The shoulders 38' are intermediate the ends of the elongated members 36'. This embodiment may be used where a different spring constant or spring pressure is required that can be provided with the embodiment shown in FIGS. 2 and 3. A severe radial distortion will still not permanently deform the cantilever springs 36' even though these are connected to a common ring 50 because the ring can move axially to accommodate such a distortion. As shown in FIG. 7, the shoulders 38' deflect inward a few mils when the device is inserted in the guide tube 14 so that the interference fit is provided.

I claim:

1. A stabilizing device for a nuclear reactor control rod, the rod being adapted for telescoping movement within a guide tube having an upward flow of liquid coolant therethrough comprising:
   a base section for rigidly connecting the upper end of the device to the lower end of the poison-bearing portion of the rod;
   cantilevered spring means spaced about and extending longitudinally downward from the outer circumference of the base means to form an open-ended hollow inner region;
   said cantilevered spring means having shoulders thereon for contacting the guide tube wall and providing an interference fit therebetween having substantially uniform radial forces distributed around the inner walls of the guide tube whereby the rod is centered within the guide tube and may longitudinally move in the tube; and
   whereby at least some of the liquid coolant may bypass the shoulders through said hollow inner region.

2. The device recited in claim 1 wherein the shoulders are on the lower end of each spring.

3. The device recited in claim 1 wherein each shoulder is intermediate the end of a spring, and wherein the lower ends of the springs are joined by a common ring which defines the entrance to the hollow inner region.

4. The device recited in claims 2 or 3 wherein the total shoulder area for contacting the tube is at least ½ the cross-sectional area of the tube.

5. The device recited in claim 4 wherein the spring constant at the shoulder of each spring is between 0.01 and 0.05 inches per pound.

6. The device recited in claim 5 wherein the spaces between the springs provide a flow path for coolant to bypass the shoulders.

7. In a nuclear reactor control rod of the type having neutron poison within a sealed container adapted for telescoping movement within a guide tube having an upward flow of liquid coolant therethrough, the improvement comprising:
   an open-ended, hollow elongated member rigidly connected to and extending longitudinally downward from the lower end of the poison-bearing portion of the rod, the member having a transverse outer cross section smaller than that of the inside of the guide tube;
   interference means projecting outwardly from the elongated member and cooperating with the member and the inside wall of the guide tube, for centering the rod within the guide tube; and
   flow means formed on the elongated member for defining a flow path whereby liquid entering the hollow region within the elongated section may exit the elongated section above the interference means.

8. The improved control rod of claim 7 wherein the elongated member comprises a plurality of adjacent cantilever springs and the interference means comprises a shoulder on each of the cantilever springs.

* * * * *